United States Patent [19]
Myers et al.

[11] 3,854,299
[45] Dec. 17, 1974

[54] COOLING CONCENTRATED, DIAPHRAGM CELL SODIUM HYDROXIDE SOLUTIONS

[75] Inventors: Harold D. Myers; William G. Moore, both of Midland, Mich.

[73] Assignee: The Dow Chemical Company, Midland, Mich.

[22] Filed: Oct. 27, 1971

[21] Appl. No.: 192,941

[52] U.S. Cl.......................... 62/58, 23/303, 23/302, 23/300
[51] Int. Cl.............................................. B01d 9/04
[58] Field of Search ........... 62/58; 23/296, 300, 303

[56] References Cited
UNITED STATES PATENTS

| 3,486 | 12001969 | Hendrix | 62/58 |
|---|---|---|---|
| 3,486,848 | 12/1969 | Hendrix | 62/58 |
| 2,129,464 | 9/1938 | Cunningham | 23/296 |
| 3,423,187 | 1/1969 | Goodenough | 23/296 |
| 3,655,333 | 4/1972 | Stenger | 23/303 |

OTHER PUBLICATIONS
Shreve–Chemical Process Industries, 3rd Ed., McGraw–Hill, N.Y., 1967, pp. 235, 236.

*Primary Examiner*—Norman Yudkoff
*Assistant Examiner*—Hiram H. Bernstein
*Attorney, Agent, or Firm*—Stephen S. Grace; Robert W. Selby; Glenn H. Korfhage

[57] ABSTRACT

A cooling technique whereby a hot, concentrated, diaphragm cell sodium hydroxide solution coming from an evaporator is cooled and sodium chloride removed therefrom. The sodium hydroxide solution is contacted with a liquid refrigerant to cool the solution and precipitate the salt. The salt is separated from the cooled solution. The liquid refrigerant can be recovered and recycled. Such method avoids the use of conventional tube heat exchangers which are periodically plugged by the salt precipitate. Also, the direct contact cooling method provides conditions for salt crystal growth thus making subsequent separation easier to accomplish.

24 Claims, 1 Drawing Figure

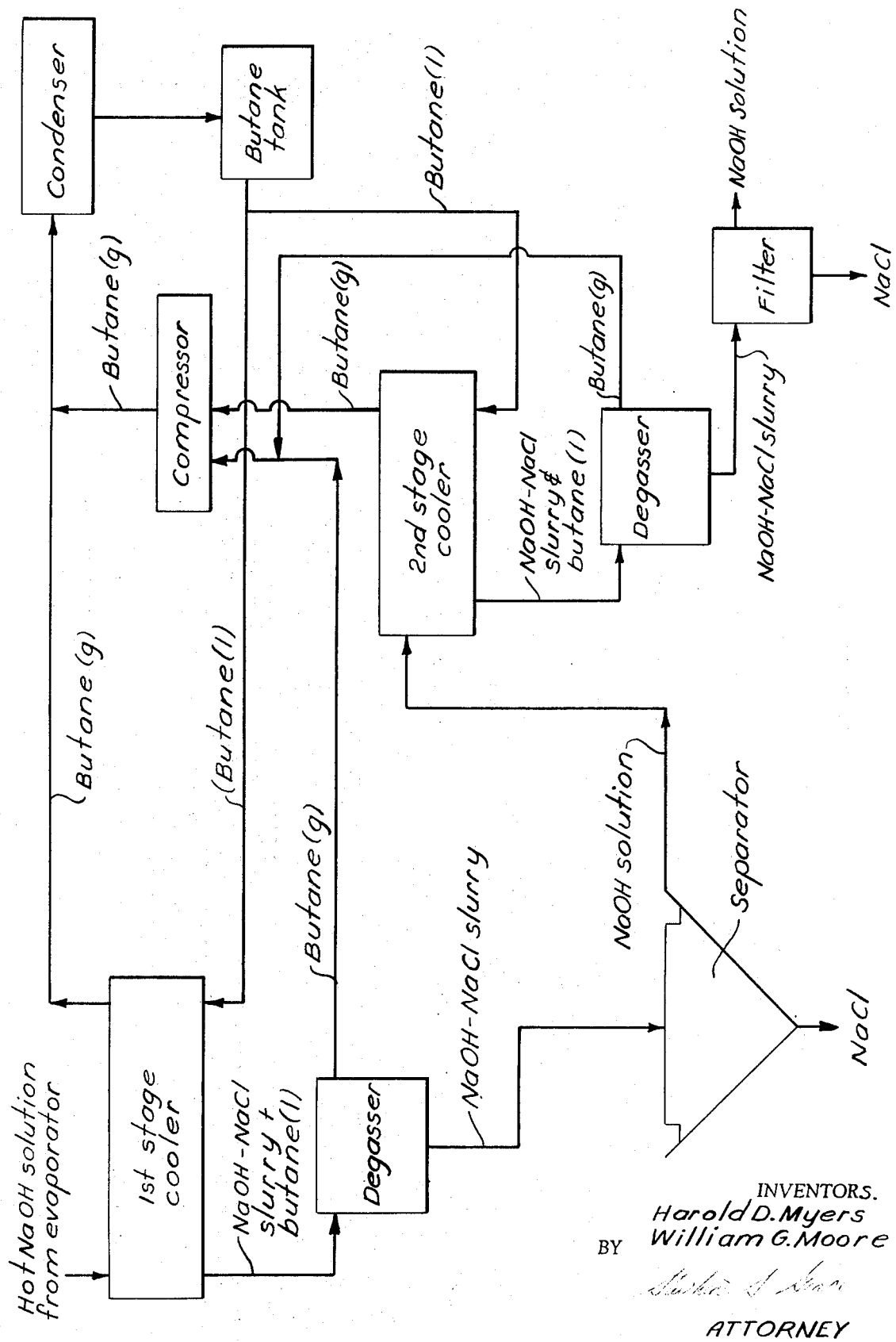

COOLING CONCENTRATED, DIAPHRAGM CELL SODIUM HYDROXIDE SOLUTIONS

BACKGROUND OF THE INVENTION

One conventional method of manufacturing sodium hydroxide involves the electrolysis of a sodium chloride brine in the diaphragm electrolytic cell. Chlorine is produced at the anode and a dilute sodium hydroxide solution containing salt is produced at the cathode, e.g., 8–10% NaOH, 12–15% NaCl. Through a series of evaporation-cooling steps such sodium hydroxide solution is concentrated to 50 weight per cent NaOH and further to 73% NaOH. As the sodium hydroxide solution is concentrated, the solubility of sodium chloride in such solution decreases. Thus, for example, when hot 50% NaOH solution at 200°F is cooled to 70°F some sodium chloride is precipitated. Such cooling is accomplished, for example, by a two-stage operation employing standard shell and tube heat exchanger equipment. The sodium hydroxide solution is passed through the tubes where salt crystals are formed during the cooling process. The initial cooling step drops the solution temperature to about 110°F. The solid sodium chloride is then separated from the caustic solution which is then subjected to a second cooling through another heat exchanger. More salt is precipitated during the second cooling and is removed from the sodium hydroxide solution by filtration. In this manner the salt content of the 50 percent caustic solution is reduced from about 3 percent to about 1 percent.

Such cooling technique is not without its disadvantages. The salt which precipitates during the cooling periodically plugs the heat exchanger tubes. When this occurs, the solution must be diverted from the heat exchanger and the tubes washed with water to solubilize the salt and wash the material out of the tubes. In order to maintain a constant flow through it, it is therefore necessary to have extra heat exchangers on hand to take up the diverted hot caustic solution from the plugged heat exchanger. Moreover in settling out or separating the sodium chloride crystals from the caustic solution, particularly in the first cooling stage, it is desirable to have large sodium chloride crystals for easy separation. However, the conditions under which the hot, concentrated caustic solution is cooled employing the tube heat exchanger are not conducive to crystal growth. The large temperature differential required between the cooling liquid and the hot caustic solution causes the sodium chloride to crystallize through the formation of new nuclei rather than as growth on existing crystals present in the caustic solution from the previous concentrating steps.

Thus, it would be desirable to find a process for cooling these hot, concentrated sodium hydroxide solutions which avoids the tube heat exchanger plugging problem and promotes crystal growth for easier separation of the sodium chloride from the cooled caustic solution.

An object of the present invention is to provide a method of cooling concentrated, diaphragm cell sodium hydroxide solutions.

A further object of the present invention is to provide a method of cooling these concentrated sodium hydroxide solutions without the use of tube heat exchangers and under conditions which achieve sodium chloride crystal growth.

THE INVENTION

The present process comprises cooling a hot concentrated diaphragm cell sodium hydroxide solution containing sodium chloride by contact with a liquid refrigerant and separating the sodium chloride which is precipitated during such cooling from the residual sodium hydroxide solution. Contact of the hot sodium hydroxide solution with the liquid refrigerant vaporizes such refrigerant causing cooling of the caustic solution and precipitation of the sodium chloride. This technique thus avoids the need to use the tube heat exchanger system. Also, the temperature differential between the hot caustic solution being cooled and the temperature of the refrigerant is quite small, e.g., on the order of 5°F. This low temperature differential allows sodium chloride solidification by crystal growth rather than a spontaneous nucleation. The sodium chloride thus precipitated is of a larger crystal size and more easily separated from the sodium hydroxide solution.

Any refrigerant which is immiscible and essentially unreactive with the sodium hydroxide solutions can be employed in the present process. Examples include butane, propane, a number of fluorinated hydrocarbons under the trademark Freon and mixtures of these. The refrigerant in a liquid state is contacted with the sodium hydroxide solution. Heat from solution is extracted as the liquid refrigerant vaporizes. The refrigerant vapor can be collected, recondensed and recycled back for further contact with hot caustic solutions.

The cooling and separating steps can each be carried out in single steps; sequential series, e.g., partial cooling, salt separation, further cooling and final salt removal; or multi-staged operations, e.g., two stage cooling, centrifuging the bulk of the salt, then filtering the salt fines.

PREFERRED EMBODIMENTS

Referring to the FIGURE, the present process can be carried out as shown therein. While the following description refers specifically to a 45–55 percent sodium hydroxide solution and a sequential multi-stage process, the present process is also applicable to other hot, concentrated, diaphragm cell sodium hydroxide solutions containing sodium chloride, for example, the hot caustic solutions of prior evaporation steps, using other variations of cooling and separating steps.

A 45–55 percent sodium hydroxide solution coming from an evaporator which is at least saturated with NaCl at a temperature of about 180°F–220°F is fed into a cooling tank where it is contacted with liquid butane. Heat is extracted from the solution cooling the solution to about 110°–120°F. The butane is vaporized and removed from the cooler. The sodium hydroxide solution which now contains sodium chloride crystals is removed from the cooler. While not necessary to the process, it is desirable to remove any entrained liquid butane from the sodium hydroxide slurry. This is accomplished by passing the slurry through a degassing tank which, due to the lower pressure employed, vaporizes any liquid butane in the slurry. The sodium hydroxide solution is then passed to a separator. The overflow-clears of the separator, which contains about 1.3 percent sodium chloride, are fed into a second cooling chamber and contacted again with liquid butane to reduce the temperature to about 65–75°F. Once again the butane is vaporized and removed from the coolant.

The sodium hydroxide slurry so formed is passed through a degasser where any liquid butane is removed and then through a filter which removes any of the solid sodium chloride. The sodium hydroxide solution coming out of the filter now contains about 1 percent soluble sodium chloride. Such solution can be used as such or further concentrated to, for example, 73 percent sodium hydroxide. The vaporized butane can be recycled through a condenser into a butane storage tank which serves as a source of supply for the liquid butane. The vaporized butane coming from the second stage cooler can be passed through a compressor to increase the pressure to allow condensation with cooling water which is normally available at about 70°–90°F.

As previously indicated, particularly in the first stage cooler, sodium chloride crystallization occurs at least in part through growth on already existing crystals coming from the solution feed. The retention time in the first stage cooler is thus dependent upon the size of the sodium chloride crystals desired for ease of separation of such crystals from the residual sodium hydroxide solution. For a desired production rate and retention time, the size of the cooling units can be calculated by those with ordinary skill in the art. Also known to those skilled in the crystallization art is the dependence of final salt crystal size on the initial crystal size and number in the sodium hydroxide feed.

To show the effect of the direct contact cooling technique on sodium chloride crystal growth, a series of tests were carried out employing a vertical tank in which hot sodium hydroxide solution was fed into the top and contacted with liquid butane to cool to about 115°F. The caustic was pumped into the cooler from a storage tank. The cooled sodium hydroxide containing sodium chloride crystals was passed to a degasser where any entrained butane was allowed to boil out of the sodium hydroxide at the reduced pressure present in the degasser. The sodium hydroxide solution was recirculated in the degasser to prevent settling of the solid sodium chloride. To simulate the conditions from a production evaporator, the 50 percent sodium hydroxide solution was spiked with salt, both a fine salt called "flour salt" and a larger size salt called "granular salt," the latter more nearly represented the size of the salt crystals present in an evaporator solution. From the cooler, sodium chloride samples were taken after a period of steady state operation. The crystal size distributions were determined in the following manner:

1. the feed or product slurry was filtered in the stream in a steam heated oven to minimize cooling of the slurry during filtration;
2. the filtered sodium chloride was then given a preliminary wash with sodium chloride saturated ethanol on the filter;
3. the partially washed filter cake was slurried in a sodium chloride saturated ethanol and filtered again;
4. the filter cake was tumble dried to minimize agglomeration during drying;
5. the dried sodium chloride was then screened to yield size distribution. The table below summarizes the results of such tests.

TABLE

| Example | Salt Feed | Retention Time (min.) | Average Particle Size (microns) | |
|---------|-----------|----------------------|------|---------|
| | | | Feed | Product |
| 1 | Flour | 73 | 135 | 158 |
| 2 | Granular | 45 | 237 | 265 |
| 3 | Granular | 20 | 357 | 392 |

It can be seen from the above data even for short retention times in the cooler the direct contact cooling technique resulted in about a 10 percent increase in average crystal size (Examples 2 and 3). With longer retention times crystal growth is even more pronounced (Example 1).

As described above in a similar manner other hot concentrated sodium hydroxide solution obtained from the diaphragm cell effluent can be cooled and the sodium chloride removed therefrom by the present method.

What is claimed is:

1. A process to reduce the sodium chloride concentration in a sodium hydroxide solution which comprises:
   a. cooling a hot, concentrated, diaphragm cell sodium hydroxide solution containing sodium chloride by contact with a liquid refrigerant, whereby sodium chloride is precipitated; and
   b. separating the precipitated sodium chloride from the sodium hydroxide solution.

2. The method of claim 1 wherein the liquid refrigerant is butane.

3. The method of claim 1 including the additional steps of recovering the refrigerant which has vaporized after contact with the sodium hydroxide solution in step (a) and recondensing and recycling the refrigerant to contact further sodium hydroxide solution.

4. The method of claim 1 including the additional step of removing entrained liquid refrigerant from the sodium hydroxide solution prior to step (b).

5. A process which comprises:
   a. partially cooling a hot, concentrated, diaphragm cell sodium hydroxide solution containing sodium chloride by contact with a liquid refrigerant, whereby a portion of the sodium chloride is precipitated so that the concentration of sodium chloride remaining in the sodium hydroxide solution is reduced;
   b. separating the precipitated sodium chloride from the sodium hydroxide solution;
   c. further cooling the sodium hydroxide solution by contact with a liquid refrigerant to precipitate another portion of the sodium chloride so that the concentration of sodium chloride remaining in the sodium hydroxide solution is further reduced; and
   d. filtering the cooled sodium hydroxide solution to remove the sodium chloride.

6. The method of claim 5 wherein in step (a) the sodium hydroxide solution is from about 45 to about 55 weight per cent sodium hydroxide which is at least saturated with sodium chloride and the initial solution temperature is from about 180°F to about 220°F.

7. The method of claim 6 wherein in step (a) the solution is cooled to a temperature of from about 110°F to about 120°F.

8. The method of claim 7 wherein in step (c) the solution is further cooled to a temperature of from about 65°F to about 75°F.

9. The method of claim 1 wherein the refrigerant is selected from the group consisting of butane, propane and fluorinated hydrocarbons.

10. The method of claim 1 wherein the refrigerant is propane.

11. The method of claim 1 wherein sufficient sodium chloride is separated to reduce the concentration thereof to less than about 1.3 weight per cent of the sodium hydroxide solution.

12. The method of claim 1 wherein the temperature difference between the liquid refrigerant and the sodium hydroxide solution is up to about 5°F.

13. The method of claim 5 wherein the refrigerant is selected from the group consisting of butane, propane and fluorinated hydrocarbons.

14. The method of claim 5 wherein the refrigerant is propane.

15. The method of claim 5 wherein sufficient sodium chloride is separated in step (b) to reduce the sodium chloride concentration to less than about 1.3 weight per cent of the sodium hydroxide solution.

16. The method of claim 15 wherein sufficient sodium chloride is filtered in step (d) to reduce the sodium chloride concentration to less than about 1 weight per cent of the sodium hydroxide solution.

17. The method of claim 5 wherein sufficient sodium chloride is filtered in step (d) to reduce the sodium chloride concentration to less than about 1 weight per cent of the sodium hydroxide solution.

18. In a process to reduce the sodium chloride concentration in a diaphragm cell sodium hydroxide solution by cooling the solution, the improvement comprising contacting the sodium hydroxide solution with an immiscible liquid refrigerant, the liquid refrigerant having a temperature of up to about 5°F. less than the temperature of the solution, thereby to precipitate sodium chloride by cooling the solution through vaporization of the refrigerant; and separating the precipitated sodium chloride from the sodium hydroxide solution.

19. The improvement of claim 18 wherein sufficient sodium chloride is separated to reduce the sodium chloride concentration to less than about 1.3 weight per cent of the sodium hydroxide solution.

20. The improvement of claim 18 including further cooling the sodium hydroxide solution by contact with a liquid refrigerant to precipitate another portion of sodium chloride; and filtering the cooled sodium hydroxide solution to remove the sodium chloride.

21. The improvement of claim 20 wherein sufficient sodium chloride is filtered to reduce the sodium chloride concentration to less than about 1 weight per cent of the sodium hydroxide solution.

22. The improvement of claim 20 wherein in step (a) the sodium hydroxide solution is from about 45 to about 55 weight per cent sodium hydroxide which is at least saturated with sodium chloride and the initial solution temperature is from about 180°F. to about 220°F.

23. The improvement of claim 22 wherein in step (a) the solution is cooled to a temperature of from about 110°F. to about 120°F.

24. The improvement of claim 23 wherein in step (c) the solution is further cooled to a temperature of from about 65°F. to about 75°F.

* * * * *